United States Patent [19]
Wiedeman et al.

[11] 3,725,564
[45] Apr. 3, 1973

[54] GROUNDED MULTILAYER INSULATION

[75] Inventors: Robert A. Wiedeman, Los Altos; Harold L. Hillesland, Fremont, both of Calif.

[73] Assignee: The United States of America as represented by the Secretary of the Air Force

[22] Filed: Sept. 23, 1971

[21] Appl. No.: 182,970

[52] U.S. Cl. .................................. 174/6, 174/35 MS
[51] Int. Cl. ............................................... H01r 3/06
[58] Field of Search ....174/35 MS, 35 R, 5 SB, 5 SG; 317/2 B, 2 C, 2 R; 174/6

[56] References Cited

UNITED STATES PATENTS

| | | | |
|---|---|---|---|
| 1,370,093 | 3/1921 | Crouse et al. | 174/35 MS X |
| 2,405,987 | 8/1946 | Arnold | 174/35 MS |
| 3,390,491 | 7/1968 | Hayden et al. | 174/35 MS |

Primary Examiner—Bernard A. Gilheany
Attorney—Harry A. Herbert, Jr. et al.

[57] ABSTRACT

A grounded multilayer insulation having a grounding net sandwiched between a layer of insulation and a binder material. The grounding net has at least one grounding tab secured thereto. When attachment of the multilayer insulation takes place the same fastener attaches both the grounding tab and insulation.

1 Claim, 5 Drawing Figures

PATENTED APR 3 1973　　　　　　　　　　3,725,564

INVENTORS
ROBERT A. WIEDEMAN
HAROLD L. HILLESLAND
BY Harry A. Herbert Jr.
Jacob N. Erlich
ATTORNEYS

GROUNDED MULTILAYER INSULATION

BACKGROUND OF THE INVENTION

This invention relates generally to insulation blankets and, more particularly, to the construction of a grounded multilayer insulation.

In today's highly industrialized environment, it becomes more and more important to properly ground and insulate much of the equipment used in industry, defense and the home.

Properly grounding such equipment limits the voltage on the metallic portion of equipment to a safe value, and thus eliminates a hazard to human life. Further, providing a low impedance return path to ground for current resulting from certain types of faults within the equipment also prevents impending disasters. Lastly, and possibly most important, in the area of rocket engines with pyrotechnic activated igniters the static electric discharge or RF induced charge can ignite the pyrotechnic device which, in turn, will ignite and induce burning of the rocket motors. For this reason, it is required that all rocket motors be grounded to prevent the accumulation of static charge on the equipment, thereby protecting material and personnel in the area where this explosive hazard exists.

In the area of grounding multilayer insulation utilized with such rockets, for example, heretofore the grounding technique was divided into two basic concepts, the conductive ink grounding and the edge grounding, neither of which satisfies the requirement of permanent grounding of the equipment. The inherent fault common to both methods of grounding is that the aluminum surface on the H film or Mylar is extremely thin and, when bent or wrinkled, the aluminum breaks up into islands which are not grounded. In the case of the ink, the ink cracks when wrinkled, also eliminating the ground path.

SUMMARY OF THE INVENTION

The instant invention sets forth a grounded multilayer insulation which overcomes the problems set forth hereinabove.

In this invention a grounding of the interior and exterior layer of the insulation blanket takes place, thus draining off any unwanted electrical charge. In the construction of the grounded multilayer insulation of this invention, the first step requires the spot welding of grounding discs and grounding tabs to a ground wire net, thereby forming a grounding net. The insulation is in the form of a blanket of insulation placed upon any suitable tooling mandrel thereby forming any desired shape. The grounding net heretofore constructed is then mounted thereupon. Finally, an epoxy pre-impregnated glass cloth is placed on top of the grounding net. The entire assembly is cured using heat and pressure, so that in its final form it may be utilized as a grounded insulation blanket for any equipment to be protected.

It is an object of this invention to provide a grounded multilayer insulation which is capable of draining off the surface charge built up by static or RF induced electricity.

It is another object of this invention to provide a grounded multilayer insulation which is of sufficient structural strength so as to prevent wrinkles from forming therein and thereby breaking the aluminum surface into ungrounded islands.

It is still another object of this invention to provide a grounded multilayer insulation which is not subject to damage during abusive handling conditions.

It is still another object of this invention to provide a grounded multilayer insulation which is economical to produce, and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1A:
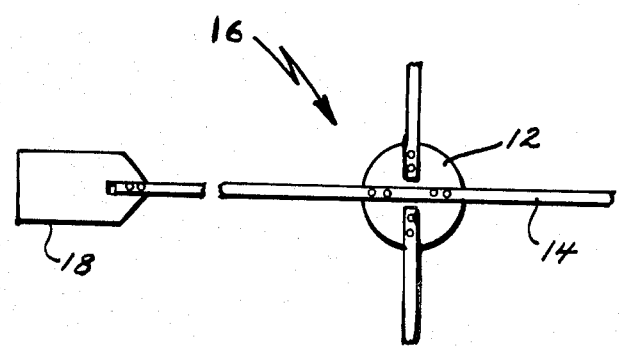
FIG. 1A is a top elevational view of the grounding net utilized in the construction of the grounded multilayer insulation of this invention.
Figure 1B:
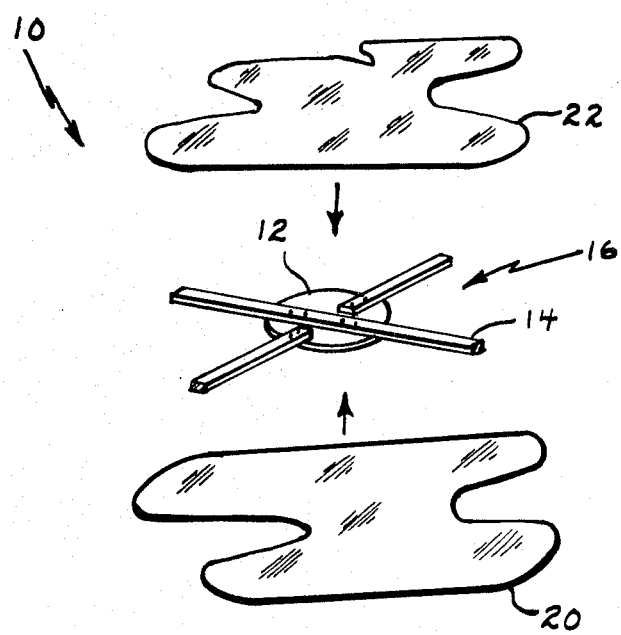
FIG. 1B is a pictorial view in exploded fashion of the various elements forming the grounded multilayer insulation of this invention.
Figure 1C:
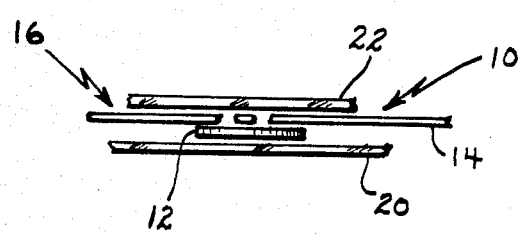
FIG. 1C is a side elevational view in exploded fashion of the various elements of the grounded multilayer insulation of this invention.

Reference is now made to FIGS. 1A, 1B and 1C of the drawing which best show the construction of the grounded multilayer insulation 10 of this invention.

Figure 2:
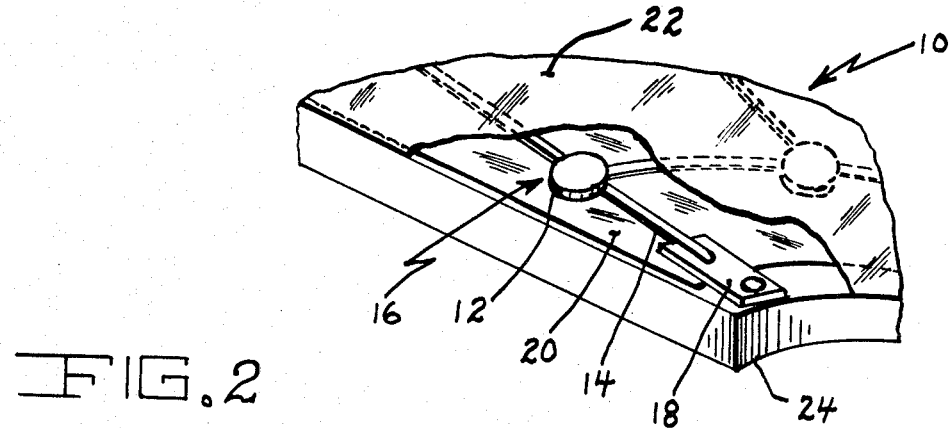
FIG. 2 is a pictorial view of the grounded multilayer insulation of this invention shown in position on a cover.
Figure 3:
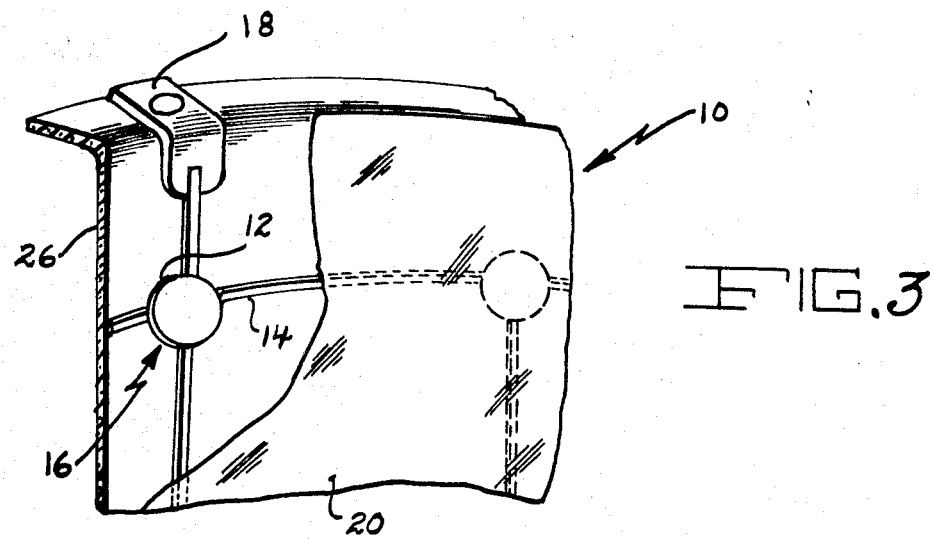
FIG. 3 is a pictorial view of the grounded multilayer insulation of this invention in the form of a fiberglass strut.

The initial step in the construction of this multilayer insulation 10 is in the securing of a plurality of grounding disks 12 by any suitable method such as spot welding to a grounding wire net 14, as shown in FIG. 1A, so as to form a grounding net 16 utilized within the multilayer insulation 10 of this invention. The disks 12 and wires 14 are so arranged to form a grid pattern preferably 6 inches × 6 inches and which is best shown in FIGS. 2 and 3 of the drawing. Upon completion of the grounding net 16 a grounding tab 18 is spot welded on at least one of the wires 14 of the grounding net 16. These grounding tabs 18 eliminate the need for routing a fragile wire or strip to a separate screw for grounding.

The next step in the construction of the multilayer insulation 10 of this invention is the selection of a suitable tooling mandrel (not shown) of any desired configuration upon which a layer of insulation 20, preferably of aluminized H film or aluminized Mylar, as shown in FIG. 1B of the drawing, is placed. The completed grounding net 16 is installed over this aluminized film 20. Any suitable binder material, such as epoxy pre-impregnated glass cloth 22, is then placed upon grounding net 16 sandwiching grounding net 16, as shown in FIGS. 1B and 1C of the drawing between insulation 20 and binder 22. The thickness of this glass cloth 22 may be as small as 0.002 inch and as great as any thickness required by structural consideration, such as shown by the strut in FIG. 3. For extremely high temperature application a polyimide pre-impregnated glass cloth may be used instead of the epoxy pre-impregnated glass cloth 22.

The entire assembly, as shown in FIG. 1C, which includes the layer of insulation 20, the grounding net 16 and the epoxy glass pre-impregnated cloth 22 is then cured in any conventional manner using heat and pressure.

As shown in FIG. 2 of the drawing the grounded multilayer insulation 10 of this invention may be secured to cover 24, for example, by placing upon this cover 24 the layer of insulation 20, the grounding net 16 and the epoxy pre-impregnated glass cloth 22. The grounding tabs 18 which have been spot welded to the wires 14 are shown integrated onto the fiberglass 22 and are in such a position that when attachment of the multilayer insulation blanket 10 takes place, the same fastener also grounds the insulation thereby eliminating the need for routing a fragile wire or strip by hand to a separate screw for grounding.

FIG. 3 shows a fiberglass strut 26 utilized in place of the pre-impregnated glass cloth and upon which is placed the grounding net 16 and a layer of insulation 20. As also seen in FIG. 3, the grounding tabs 18 are secured to the fiberglass strut 26 and are in position for easy grounding.

The construction set forth hereinabove of the grounded multilayer insulation 10 of this invention produces an insulation blanket which provides sufficient structural strength, not to be subjected to damage by handling abuse, while grounding reliably the insulation blanket by draining off the surface charge built up by static or RF induced electricity.

Although the invention has been described with reference to a particular construction and embodiment, it will be understood to those skilled in the art that this invention is also capable of a variety of alternate embodiments within the spirit and scope of the appended claims.

We claim:

1. A grounded multilayer insulation comprising a layer of insulation, a grounding net in the form of a plurality of disks and wires welded together in a grid pattern mounted upon said insulation, at least one grounding tab fixedly secured to one of said wires of said grounding net and an epoxy pre-impregnated glass cloth binder mounted upon said grounding net sandwiching said grounding net between said insulation and said binder while said grounding tab remains exposed.

* * * * *